April 28, 1936. H. GLAENZER ET AL 2,038,560
EQUALIZING AND SPRING SYSTEM
Filed April 7, 1934     4 Sheets-Sheet 1
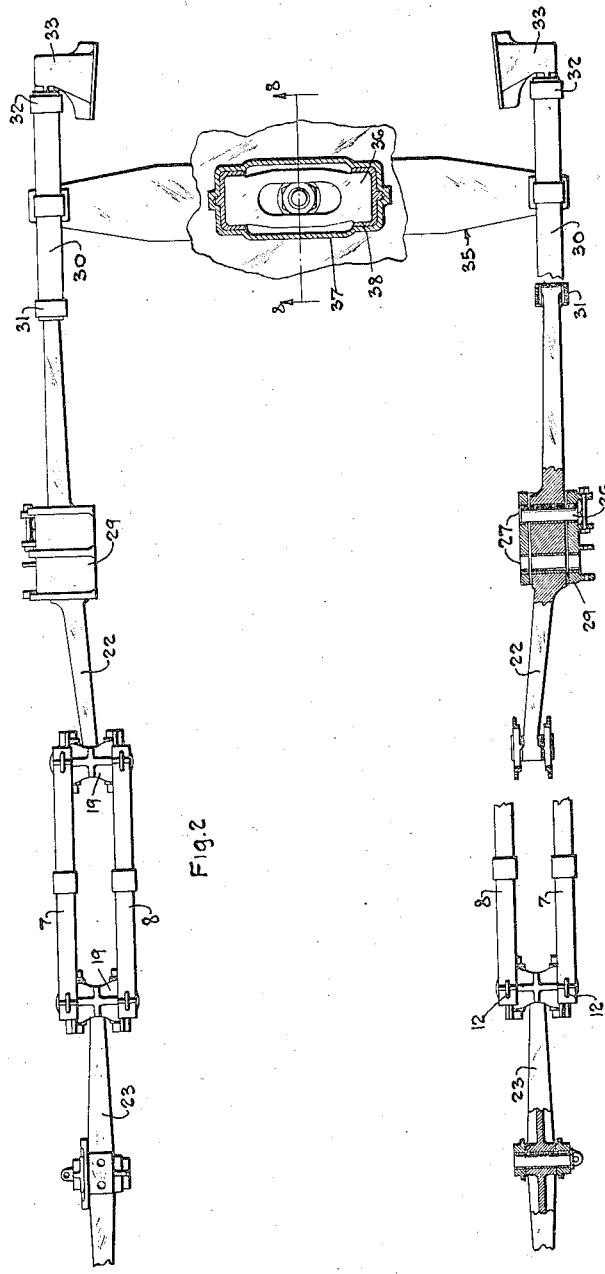
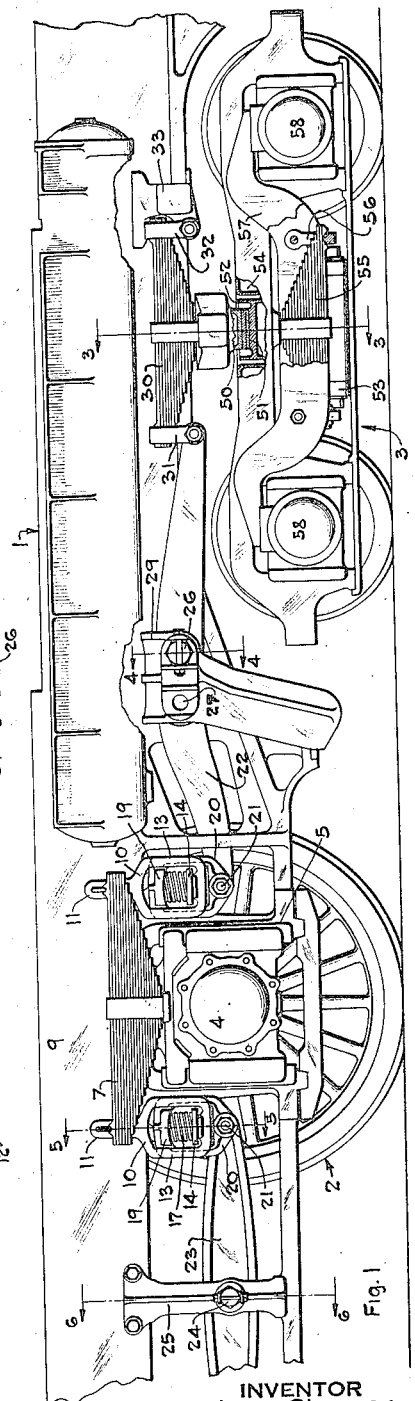
INVENTOR
Harry Glaenzer
Allen Wallace
BY
ATTORNEY

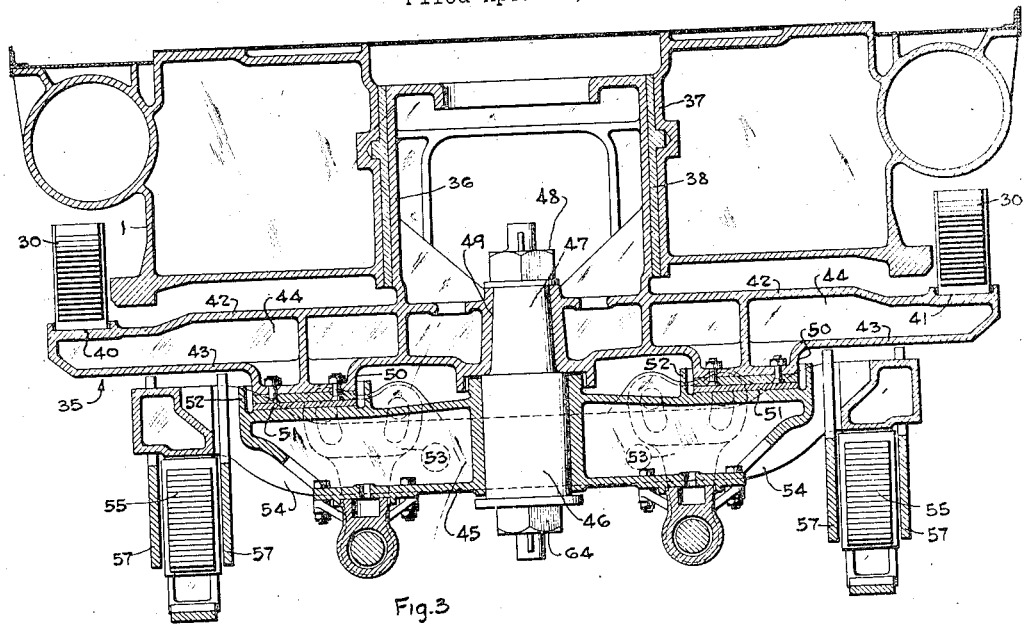

April 28, 1936.   H. GLAENZER ET AL   2,038,560
EQUALIZING AND SPRING SYSTEM
Filed April 7, 1934   4 Sheets-Sheet 3
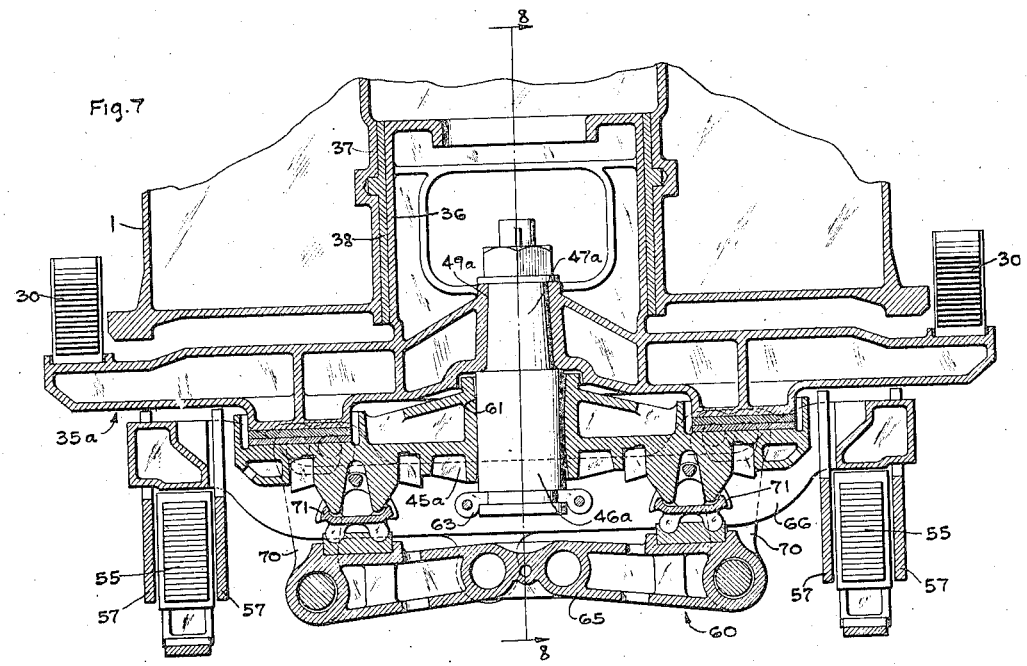
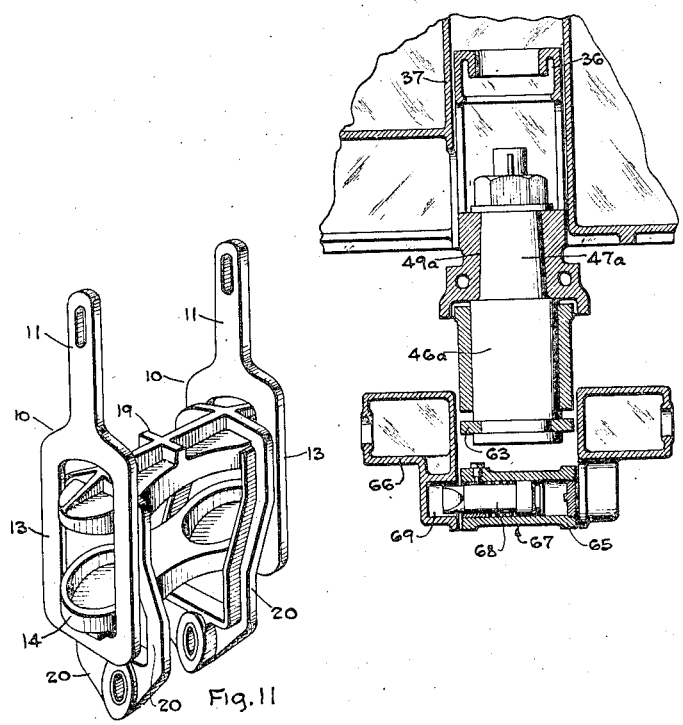
INVENTOR
Harry Glaenzer
Allen Wallace
BY
ATTORNEY

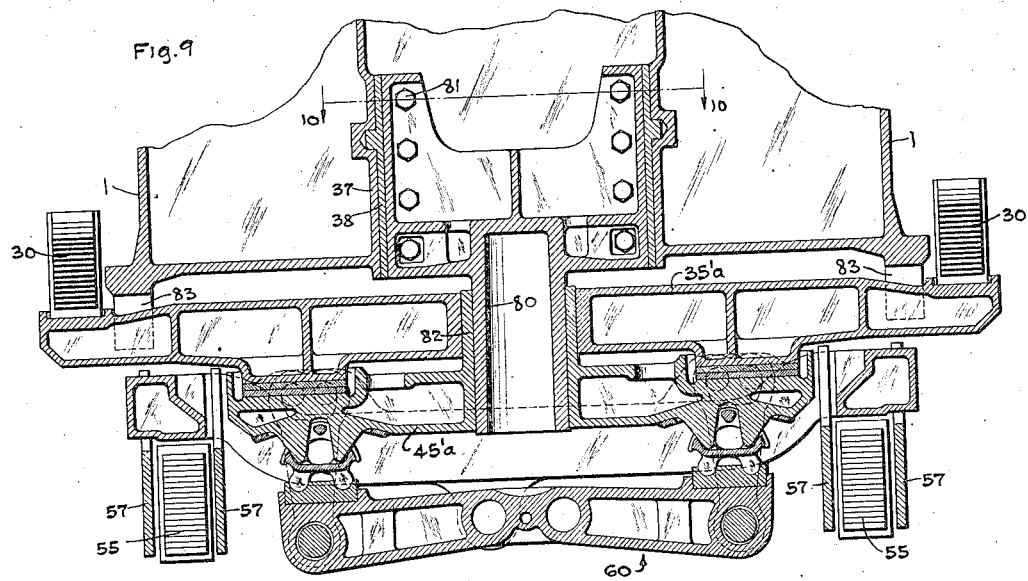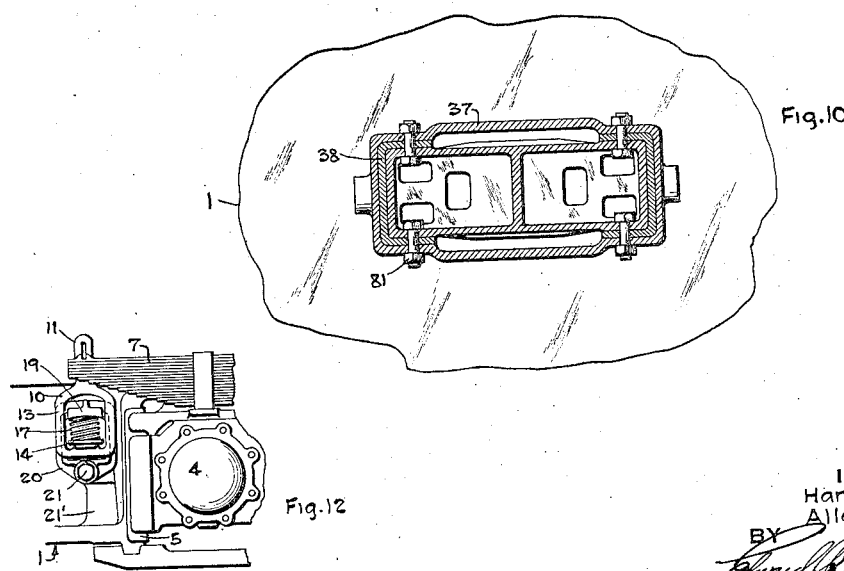

Patented Apr. 28, 1936

2,038,560

UNITED STATES PATENT OFFICE 2,038,560

EQUALIZING AND SPRING SYSTEM

Harry Glaenzer, Philadelphia, Pa., and Allen Wallace, Moorestown, N. J.

Application April 7, 1934, Serial No. 719,456

13 Claims. (Cl. 105—82)

This invention relates to an improved equalizing and spring rigging system for locomotives especially of the electric type where very high speeds are obtainable and thus create problems of a critical nature.

Various arrangements have heretofore been employed and suggested for use with electric locomotives in an attempt to obtain stability together with greater flexibility in the spring suspension, but such arrangements have been deficient in one respect or another although having some desirable qualities. Certain of the deficiencies of these prior methods have developed undesirable track stresses of a high magnitude or have imposed undesirable stresses in parts of the locomotive.

It is one object of our invention to provide an improved equalizing and spring rigging system that will avoid these prior defects while at the same time obtaining a high degree of stability. In one aspect of the invention we have provided twin equalizing driving springs located inside and outside of each main longitudinal engine frame member in combination with auxiliary coil dampening mechanism interposed between the twin driving springs and the equalizer beams.

In a more specific aspect of the invention we provide an improved equalizer spring carriage extending entirely transversely of the engine frame and supporting at its outer ends equalizer carriage springs, this carriage being pivotally supported by the truck bolster and also arranged to permit relative vertical or axial movement between the bolster and engine frame specifically by a plunger slidably but non-rotatably guided in the engine frame.

A still further object is to have the equalizer carriage adapted for cooperation in an improved manner with the truck bolster through side bearings without restricting the flexibility of operation of the cooperating elements and yet insuring maximum stability of the equalizer and spring system.

Other objects and advantages will be more apparent to those skilled in the art from the following description of the accompanying drawings in which:

Fig. 1 is a fragmentary side elevation of the locomotive embodying our improved equalizing system;

Fig. 2 is a plan view of the equalizing system removed from the locomotive for simplicity of disclosure and with parts broken away to show details of construction;

Figs. 3 to 6 are respectively vertical transverse sections taken on the lines 3—3 to 6—6 of Fig. 1;

Fig. 7 is a transverse section similar to Fig. 3 but showing a modified truck bolster in combination with our improved equalizing system;

Fig. 8 is a vertical section taken on the line 8—8 of Fig. 7;

Fig. 9 is a transverse section similar to Figs. 3 and 7 but showing a modified form of center pin arrangement;

Fig. 10 is a horizontal section taken on the line 10—10 of Fig. 9;

Fig. 11 is a perspective view of the auxiliary driving spring seats and links with the springs omitted;

Fig. 12 is a fragmentary view of a modified form of connecting lower end of auxiliary driving spring link and seat to the frame structure at the extreme end of an equalizing system.

In the illustrated embodiments of the invention which are disclosed herein merely for the purpose of showing certain specific forms among possible others that the invention might take, we have provided as shown in Fig. 1 an engine frame generally indicated at 1, preferably of an electric locomotive as it is in such type of equipment that our improved equalizing system is peculiarly adapted on account of the very high speeds at which such locomotives are designed to normally run. This frame is preferably of the integral cast type, although built-up frames might be employed. This frame normally carries a usual cab or superstructure (not shown) and is supported upon any suitable or usual running gear consisting for example of a plurality of driving wheels, of which only one set is specifically shown at 2, and leading and trailing trucks of which only one is specifically shown at 3. The driving wheels are journalled in a suitable driving box 4 guided in pedestal ways 5 which project downwardly from frame 1.

The frame is supported on the driving wheels and trucks through a spring and equalizing system consisting of a pair of twin driving springs 7 and 8 resting on top of the driving box 4 and on each side of the main side rail 9 of the engine frame, it being understood of course that the locomotive is symmetrical about its longitudinal center line so that the description for one-half of the structure will suffice for the other half thereof. Pivotally connected to the outer ends of each of the twin springs 7 and 8 are driving spring links generally indicated at 10. Each of these links has a substantially flat tongue 11 extending through aligned oblong openings 12 formed in the ends of the springs on the longitudinal center line thereof. Depending from the tongue 11 is a closed loop 13, Fig. 1, supporting a lower auxiliary driving spring seat 14 which as shown in Fig. 5 has a pair of grooves 15 and 16 to receive the lower inner edges of the loops 13. Substantially vertically disposed auxiliary driving springs specifically in the form of two sets of springs 17 and 18, each set having a pair of concentrically arranged coil springs, are interposed between seat 14 and an upper auxiliary driving spring seat 19. This upper seat has a pair of arms 20, 20 depending from each side of the seat and extending between the pair of links 10, 10, Fig. 5. The lower ends of seat arms 20 are pivotally connected as at 21 to equalizing beams 22 and 23. The equalizing beam 23 is fulcrumed at 24 to a strut 25, this strut being either integrally or separately connected with frame 1 in any suitable manner. The left hand end of beam 23 is connected to a spring link for the next adjacent set of driving wheels. It is not necessary to describe the equalizing and spring rigging system from there on as the same is identical to the arrangement being described. In some instances it may be desirable to connect the extreme end of the equalizing system to the frame structure as by a lug 21' thereof shown in Fig. 12.

The equalizing beam 22 is fulcrumed by a pin 26 passing through either one of a series of holes 27 in a bracket 29. This bracket may be either formed integrally or separately from the frame as desired. The front end of beam 22 is pivotally connected to a spring 30 as through a link 31. Only a single spring 30 is used, and this as shown more clearly in Fig. 3 is disposed outside of the engine frame 1. The front end of this spring is pivotally connected by a link 32 to a suitable bracket 33 secured either integrally or separately to the engine frame.

Spring 30 is supported on an equalizer spring carriage and plunger generally indicated at 35. This member extends transversely beneath the engine frame 1 and has a plunger 36 suitably slidably guided in a bearing housing 37 formed preferably as an integral part of the engine frame at the center thereof. This housing may be provided with any suitable liner 38. It will be noted that the carriage 35 has spring seats 40 and 41 at the outer ends thereof and is of substantially box-shape cross-section in that it has upper and lower portions 42 and 43 with connecting webs 44 and other ribs as shown.

The center of the carriage is operatively connected to an engine truck bolster 45, this connection being specifically made by a center pin 46 having preferably a tapered shank 47 securely held by a bolt 48 in a socket 49 of the carriage. The engine truck bolster 45 is adapted to turn on center pin 46 but it not intended to have axial movement thereof. The center pin, however, does not carry any vertical load from the equalizer carriage to the bolster as clearance is provided at both the top and bottom of the bolster around the center pin. However, the weight from the equalizer carriage is transmitted directly to the bolster through a pair of downwardly projecting bearing portions 50 of the carriage resting on the truck bolster as at 51, the contacting surfaces of these two members being provided if desired with suitable wearing plates and the whole forming what is hereinafter referred to as the truck side bearing. The truck bolster has a flange 52 encircling the side bearing in spaced relation thereto to provide a lubricant receptacle for the bearing.

As is well known, the bolster 45 transmits the weight to the truck 3 as in any usual manner such as by heart links 53 connected to the engine truck frame transom and frame 54, in turn resting upon a truck spring 55, links 56, Fig. 1, and equalizers 57 supported on the journal boxes 58.

The modification shown in Fig. 7 employs an equalizer spring carriage and plunger 35a corresponding to 35 in Fig. 3 but differs therefrom in that the tapered shank 47a is secured in an elevated socket 49a. This socket is raised to permit the use of a combined variable and constant resistance bolster, all as generally indicated at 60. This is a well-known arrangement and does not, per se, form any part of our invention. It will also be noted that the center pin 46a is received in the engine truck bolster 45a through an opening 61 that gradually enlarges from its center toward its opposite ends. This tapered construction may be employed with the bolster 45 of Fig. 3 if desired. Also a center pin split collar 63 is received in a suitable recess of center pin 46a rather than to employ a nut and washer 64 as shown in Fig. 3. If it is desired to have the lower portion of the bolster 65 and truck frame transom 66 rigidly connected together to eliminate one phase of operation of this type of bolster, there is provided a locking arrangement generally indicated at 67 in Fig. 8. This locking arrangement includes a plunger 68 preferably fluid-actuated and carried in the lower bolster portion 65 so as to be insertable within an opening 69 in the truck transom 66. The method of operation of this arrangement is as follows. First it should be noticed that the bolster 45a has no lateral movement in relation to the equalizer carriage 35a but is adapted only to turn around the center pin 46a. The lateral motion of the truck, such as is necessary for the truck to guide the locomotive, is obtained in the usual manner, that is, the truck frame transom moves laterally in relation to the bolster by the swinging of the heart links 70, or if the bolster is locked by plunger 68, then the bolster moves laterally in relation to the truck frame by rolling on rockers 71. Fig. 8 shows the locking plunger locked in the truck transom, this being the condition when constant resistance is desired with the result that the upper portion of the bolster must move laterally on the rockers if there is to be any side motion of the truck frame and therefore to the wheels so that the same may track on a curve. When variable resistance of a relatively low value is desired, the lock bolt 68 is withdrawn from the transom by releasing the fluid pressure whereupon both upper and lower portions 45a and 64 of the bolster will operate as a unit due to an initial resistance of some magnitude and swing solely on the heart links 70. Since the center pin restrains the upper portion of the bolster, the net result is that the truck frame has the lateral movement necessary for it to track properly. The specific bolster arrangement above described does not form a part of our present invention except as it is embodied in our complete combination.

In the modification shown in Fig. 9, a center pin 80 is rigidly connected to the engine frame 1 as by a series of bolts 81. This center pin if desired or convenient could be cast integral with the frame 1. The upper bolster 45a' has a sleeve 82 mounted for axial and rotatable movement on center pin 80 while the equalizer carriage 35a' is supported on sleeve 82 to permit rotation relatively thereto. To prevent swinging movement of carriage 35a', there is provided a pair of lugs 83 depending from the engine frame 1 on each side of the carriage. These are necessary in Fig. 9 due to the center pin 80 and sleeve 82 being cylindrical in cross-section, whereas in the other forms the plunger 36, Fig. 3, is oblong in cross-section as particularly shown in Fig. 2.

From the foregoing disclosure of the various forms, it is seen that we have provided an extremely stable and yet highly flexible equalizing and spring rigging that is particularly adapted for high speed locomotives such as the electric type. The equalizer carriage by extending laterally beyond both sides of the engine frame and supporting springs at the outer carriage ends insures a maximum leverage system giving stability, while the multiplicity and arrangement of springs insures the necessary resilient and flexible riding qualities. The various elements of our improved combination are so constructed and arranged that they cooperate in a manner requiring minimum space and maximum accessibility consistent with obtaining the desired results. Our improved combination is also adapted to be readily applied to existing equipment as well as new equipment without materially departing from otherwise standard designs and without involving excessive cost.

It will of course be understood that various changes in details of construction and arrangement of parts may be made by those skilled in the art without departing from the spirit of the invention as set forth in the appended claims.

We claim:

1. An electric locomotive comprising, in combination, a frame having longitudinal side members, driving wheels and journal boxes therefor, twin driving springs one disposed on each side of said longitudinal frame member and supported on said journal boxes, driving spring links supported on each of the ends of said twin springs, a plurality of commonly supported auxiliary driving springs associated with the driving spring links which are disposed at one end of said springs and a plurality of commonly supported auxiliary driving springs also associated with the driving spring links which are disposed at the other end of said springs, and an equalizer system connected to said driving spring links and springs thereof.

2. The combination set forth in claim 1 further characterized in that said driving springs are provided with openings through the ends thereof and said driving spring links extend through said openings to be supported on the top of the driving springs.

3. A locomotive comprising, in combination, a frame having longitudinal side members, driving wheels and journal boxes therefor, twin driving springs one disposed on each side of said longitudinal frame member and supported on said journal boxes, driving spring links supported on each of the ends of said twin springs, a plurality of auxiliary driving springs disposed in vertical relation to the twin driving springs and located between upper and lower seats, said links having a loop encircling and supporting the lower spring seat and said upper spring seats having depending arms encircling said auxiliary springs and lower seat, and an equalizing beam pivotally connected to said depending arms.

4. A locomotive comprising, in combination, a frame having longitudinal side members, driving wheels and journal boxes therefor, twin driving springs one disposed on each side of said longitudinal frame member and supported on said journal boxes, driving spring links supported on each of the ends of said twin springs, a plurality of auxiliary driving springs disposed in vertical relation to the twin driving springs and located between upper and lower seats, said links having a loop encircling and supporting the lower spring seat and said upper spring seats having depending arms encircling said auxiliary springs and lower seat, and means for pivotally connecting said depending arms to the locomotive frame structure.

5. An electric locomotive comprising, in combination, an engine frame, driving wheels and a truck, and a spring rigging and equalizing system for said wheels and trucks including an equalizer spring carriage extending entirely transversely of said engine frame, and equalizer springs disposed outside of said frame and supported upon the outer ends of said equalizer carriage in substantial longitudinal alignment with the remaining portion of the spring rigging and equalizing system.

6. The combination set forth in claim 5 further characterized in that the trucks have bolsters provided with side bearings upon which the equalizer carriage is supported, and a center pin between said frame and truck adapted to function solely for centering purposes without carrying any load whereby the carriage-borne load is transmitted to the bolsters entirely through said side bearings.

7. The combination set forth in claim 5 further characterized in that said equalizer carriage is supported upon said truck and is operatively connected with said frame whereby said carriage and frame are adapted to have relative vertical movement.

8. An electric locomotive comprising, in combination, a frame, driving wheels and a truck, an equalizing and spring rigging system including an equalizer spring carriage extending entirely transversely of said frame, means for supporting said carriage on said truck, means operatively connecting the carriage to said frame to prevent turning of said carriage relatively thereto, and equalizer carriage springs disposed outside of said frame and supported on each of the outer ends of said carriage in substantial longitudinal alignment with the remaining portion of the spring rigging and equalizing system; and means for supporting the forward end of said carriage springs by said frame and for connecting the other ends of said springs to the equalizer system.

9. The combination set forth in claim 8 further characterized in that said carriage supporting means has provision whereby the carriage is adapted to have vertical movement relative to the frame.

10. The combination set forth in claim 8 further characterized in that said means to prevent turning of said carriage relatively to the frame includes lugs depending from said frame and engageable with said carriage to prevent turning thereof, and said means for supporting said carriage on said truck includes a center pin fixed to said frame and journalled in said bolster whereby said carriage can have axial movement on said center pin.

11. The combination set forth in claim 8 further characterized in that said means to prevent turning of said carriage relatively to the frame includes lugs depending from said frame and engageable with said carriage to prevent turning thereof, and said means for supporting said carriage on said truck includes a center pin fixed to said frame and a center pin bearing in said bolster, whereby said carriage and center pin are guided to permit said carriage to have axial movement.

12. The combination set forth in claim 8 further characterized in that said truck includes a laterally movable bolster and said carriage is supported thereon for movement therewith.

13. The combination set forth in claim 8 further characterized in that said truck has a bolster having provision for constant or variable resistance, and means whereby said carriage is supported on said bolster to be subjected to either the constant or variable resistance thereof.

HARRY GLAENZER.
ALLEN WALLACE.